United States Patent
Feng et al.

(10) Patent No.: US 8,766,927 B2
(45) Date of Patent: Jul. 1, 2014

(54) TOUCH PANEL AND DISPLAY DEVICE USING THE SAME

(75) Inventors: Chen Feng, Beijing (CN); Kai Liu, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 67 days.

(21) Appl. No.: 12/655,489

(22) Filed: Dec. 31, 2009

(65) Prior Publication Data
US 2011/0032196 A1    Feb. 10, 2011

(30) Foreign Application Priority Data
Aug. 7, 2009    (CN) .......................... 2009 1 0109569

(51) Int. Cl.
G06F 3/041    (2006.01)
(52) U.S. Cl.
USPC .......................................................... 345/173
(58) Field of Classification Search
CPC ......... G06F 3/044; B82Y 40/00; B82Y 30/00
USPC ................. 345/173–174, 182; 174/126.4
See application file for complete search history.

(56) References Cited

U.S. PATENT DOCUMENTS

| 6,806,637 | B2 * | 10/2004 | Uemura et al. | 313/495 |
|---|---|---|---|---|
| 8,125,878 | B2 * | 2/2012 | Jiang et al. | 369/173 |
| 2004/0047038 | A1 * | 3/2004 | Jiang et al. | 359/486 |
| 2006/0231946 | A1 * | 10/2006 | Pan et al. | 257/712 |
| 2008/0029292 | A1 * | 2/2008 | Takayama et al. | 174/126.4 |
| 2008/0170982 | A1 | 7/2008 | Zhang et al. | |
| 2008/0238882 | A1 | 10/2008 | Sivarajan et al. | |
| 2009/0153502 | A1 | 6/2009 | Jiang et al. | |
| 2009/0153508 | A1 | 6/2009 | Jiang et al. | |
| 2009/0153513 | A1 | 6/2009 | Liu et al. | |
| 2009/0153516 | A1 | 6/2009 | Liu et al. | |
| 2009/0153521 | A1 | 6/2009 | Jiang et al. | |
| 2009/0167707 | A1 | 7/2009 | Jiang et al. | |
| 2009/0196982 | A1 | 8/2009 | Jiang et al. | |
| 2009/0295285 | A1 * | 12/2009 | Tokunaga et al. | 313/505 |

FOREIGN PATENT DOCUMENTS

| CN | 101255590 A | 9/2008 |
|---|---|---|
| CN | 101458597 A | 6/2009 |
| CN | 101458598 A | 6/2009 |

(Continued)

OTHER PUBLICATIONS

Kazuhiro Noda, Kohtaro Tanimura, Production of Transparent Conductive Films with Inserted SiO2 Anchor Layer, and Application to a Resistive Touch Panel, Electronics and Communications in Japan, No. 7, 2001, p. 39-45, vol. 84.

(Continued)

*Primary Examiner* — Quan-Zhen Wang
*Assistant Examiner* — Calvin C Ma
(74) *Attorney, Agent, or Firm* — Novak Druce Connolly Bove + Quigg LLP (57) ABSTRACT

The present disclosure provides a touch panel and a display device employing the same. The touch panel includes at least one transparent layer consisting of a carbon nanotube metal composite layer including a carbon nanotube layer and a metal layer coated on the carbon nanotube layer.

18 Claims, 10 Drawing Sheets

(56) References Cited

FOREIGN PATENT DOCUMENTS

| | | | | | |
|---|---|---|---|---|---|
| CN | 101458600 A | | 6/2009 | | |
| CN | 101458606 A | | 6/2009 | | |
| CN | 101458607 A | | 6/2009 | | |
| CN | 101499337 A | | 8/2009 | | |
| CN | 200910109569.0 | * | 8/2009 | .............. | G06F 3/041 |
| JP | 08325195 | | 12/1996 | | |
| JP | WO2005/104141 | * | 3/2005 | .............. | G06F 3/033 |
| JP | WO2008/038764 | * | 3/2008 | .............. | H01B 5/14 |
| JP | 2008523254 | | 7/2008 | | |
| JP | 2009157924 | | 7/2009 | | |
| JP | 2009163729 | | 7/2009 | | |
| TW | 200729241 | | 8/2007 | | |
| TW | 200901016 | | 1/2009 | | |
| TW | 364860 | | 5/2012 | | |

OTHER PUBLICATIONS

Li Shuben, Wang Qindi, Ji Jianhua, Study of Continuous Coating Capacitive Touch Panels, Optoelectronic Technology in China, vol. 15, No. 1, Mar. 1995, p. 62-67.

* cited by examiner

TOUCH PANEL AND DISPLAY DEVICE USING THE SAME

RELATED APPLICATIONS

This application claims all benefits accruing under 35 U.S.C. §119 from China Patent Application No. 200910109569.0, filed on Aug. 7, 2009 in the China Intellectual Property Office.

BACKGROUND

1. Technical Field

The present disclosure relates to touch panels and display devices using the same and, in particular, to a touch panel based on carbon nanotubes and a display device employing the touch panel based on carbon nanotubes.

2. Discussion of Related Art

There has been much advancement in recent years of various electronic apparatuses towards high performance and diversification. There has been continuous growth in the number of electronic apparatuses equipped with optically transparent touch panels in the display panel (e.g., liquid crystal panels). Users may operate a touch panel by pressing or touching the touch panel with a finger, a pen/stylus, or a tool while visually observing the liquid crystal display through the touch panel. Therefore, a demand exists for touch panels that are superior in visibility and reliable in operation.

Presently, different types of touch panels have been developed, including a resistance-type, a capacitance-type, an infrared-type, and a surface sound wave-type. The resistance-type and capacitance-type touch panels have been widely used in various fields because of higher accuracy and resolution.

Conventional capacitance-type or resistive-type touch panels employ conductive indium tin oxide (ITO) as transparent conductive layers. However, the ITO layer of the touch panel has poor mechanical durability, low chemical endurance, and uneven resistance over the entire area of the touch panel. Furthermore, the ITO layer has relatively low transparency in humid environments. All the above-mentioned problems of the ITO layer results in a touch panel with relatively low sensitivity, accuracy, and brightness. Moreover, the ITO layer is generally formed by means of ion-beam sputtering, a relatively complicated method.

What is needed, therefore, is to provide a durable touch panel and a display device using the same with high sensitivity, accuracy, and brightness.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
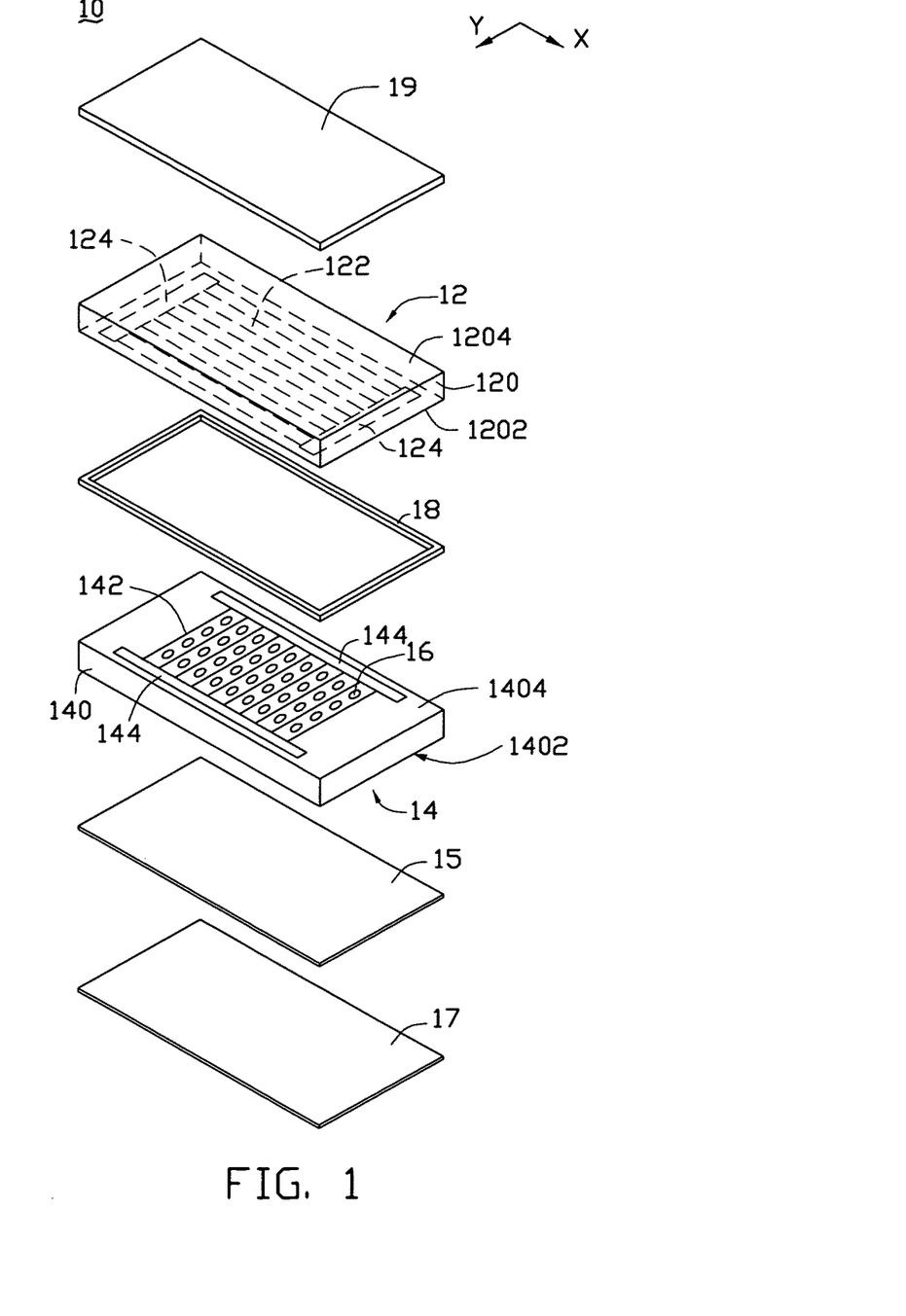
FIG. 1 is an exploded, isometric view of one embodiment of a touch panel.
Figure 2:
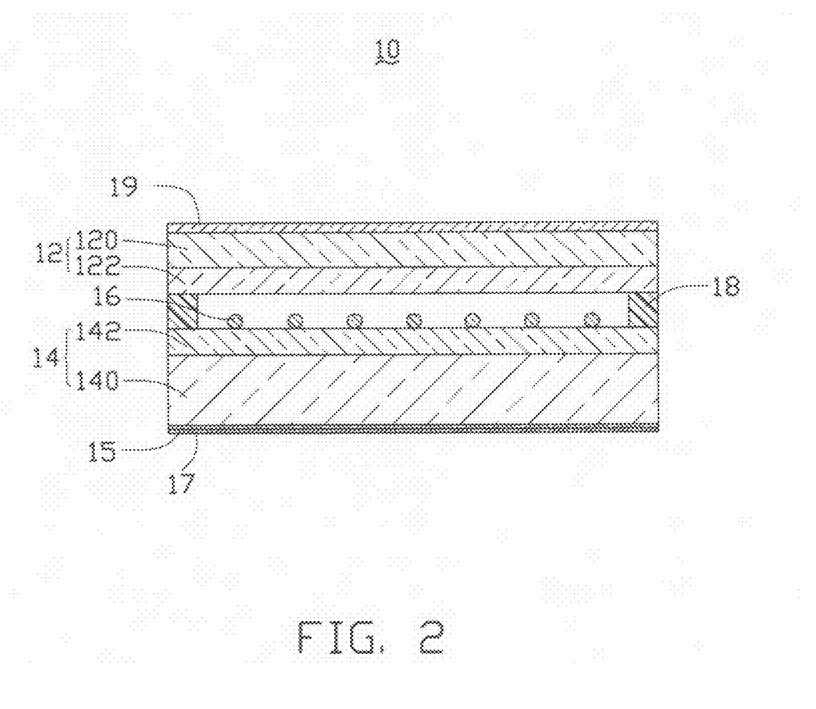
FIG. 2 is a cross-sectional view of the touch panel of FIG. 1 once assembled.

Referring to FIG. 1 and FIG. 2, one embodiment of a resistive-type touch panel 10 includes a first electrode plate 12, a second electrode plate 14, a shielding layer 15, a plurality of transparent dot spacers 16, a passivation layer 17, an insulating frame 18, and a protective layer 19. The first and second electrode plates 12, 14 are opposite to and spaced from each other by the insulating frame 18. The transparent dot spacers 16 are located between the first and second electrode plates 12, 14. The shielding layer 15 is located on a surface of the second electrode plate 14 away from the insulating frame 18. The passivation layer 17 is located on a surface of the shielding layer 15 away from the shielding layer 15. Namely, the shielding layer 15 is located between the passivation layer 17 and the second electrode plate 14. The protective layer 19 is located on a surface of the first electrode plate 12 away from the second electrode plate 14.

The first electrode plate 12 includes a first substrate 120, a first transparent conductive layer 122, and two first electrodes 124. The first substrate 120 has a planar structure, and includes a bottom surface 1202, and a top surface 1204 opposite to the bottom surface 1202. The top surface 1204 is away from the second electrode plate 14. The first transparent conductive layer 122 and the two first electrodes 124 are attached to the bottom surface 1202 of the first substrate 120. The two first electrodes 124 are electrically connected to the first transparent conductive layer 122. Specifically, the two first electrodes 124 are separately located at two ends of the first transparent conductive layer 122. A direction from one of the first-electrodes 124 across the first transparent conductive layer 122 to the other first electrode 124 is defined as a first direction. The first direction is an X direction as shown in FIG. 1.

The second electrode plate 14 includes a second substrate 140, a second transparent conductive layer 142, and two second electrodes 144. The second substrate 140 has a planar structure, and includes a bottom surface 1402 and a top surface 1404 opposite to the bottom surface 1402. The bottom surface 1402 is away from the insulating frame 18. The top surface 1404 faces the first transparent conductive layer 122. The second transparent conductive layer 142 and the two second electrodes 144 are located on the top surface 1404 of the second substrate 140. The second transparent conductive layer 142 is spaced from the first transparent conductive layer 122 a predetermined distance. In one embodiment, the distance between the first transparent conductive layer 122 and the second transparent conductive layer 142 is in a range from about 2 microns to 10 microns. The two second electrodes 144 are separately located on the top surface 1404 of the second substrate 140 along two ends in a second direction. A direction from one of the second-electrodes 144 across the second transparent conductive layer 142 to the other second-electrodes 144 is defined as the second direction, which crosses or intersects with the first direction. The second direction is a Y direction as shown in FIG. 1. In one embodiment, the Y direction is substantially perpendicular to the X direction, that is, the two first electrodes 124 are orthogonal to the two second electrodes 144. The two second electrodes 144 are also electrically connected to the second transparent conductive layer 142.

The first substrate 120 can be a transparent and flexible film or plate made of polymer, resin, or any other suitable flexible material. The flexible material can be polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, or acrylic resins. The second substrate 140 can be a rigid and transparent board made of glass, diamond, quartz, plastic, or any other suitable material, or can be a transparent flexible film or plate similar to the first substrate 120 if the touch panel 10 is flexible. A thickness of the first substrate 120 and the second substrate 140 can be in a range from about 1 millimeter to about 1 centimeter. In one embodiment, the first and second substrates 120, 140 are made of PET, and have a thickness of about 2 millimeters.

At least one of the first and second transparent conductive layers 122, 142 includes a carbon nanotube metal composite layer. A thickness of the carbon nanotube metal composite layer can be in a range from about 1.5 nanometers to about 1 millimeter. Resistances of the carbon nanotube metal composite layer can range from about 50 ohms per square to about 2000 ohms per square. The transmittance of visible light having a frequency of about 550 nanometers of the carbon nanotube metal composite layer can be in a range from about 80% to about 95%.

Figure 3:
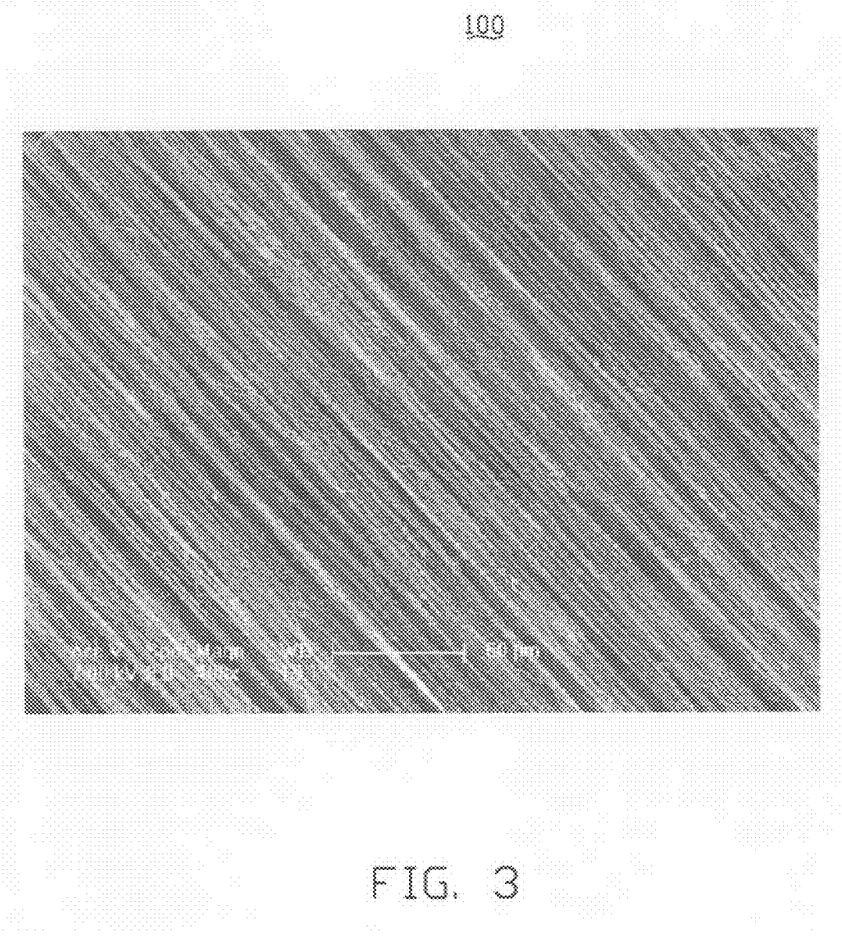
FIG. 3 shows a Scanning Electron Microscope (SEM) image of one embodiment of a carbon nanotube metal composite layer used in the touch panel of FIG. 1.
Figure 4:
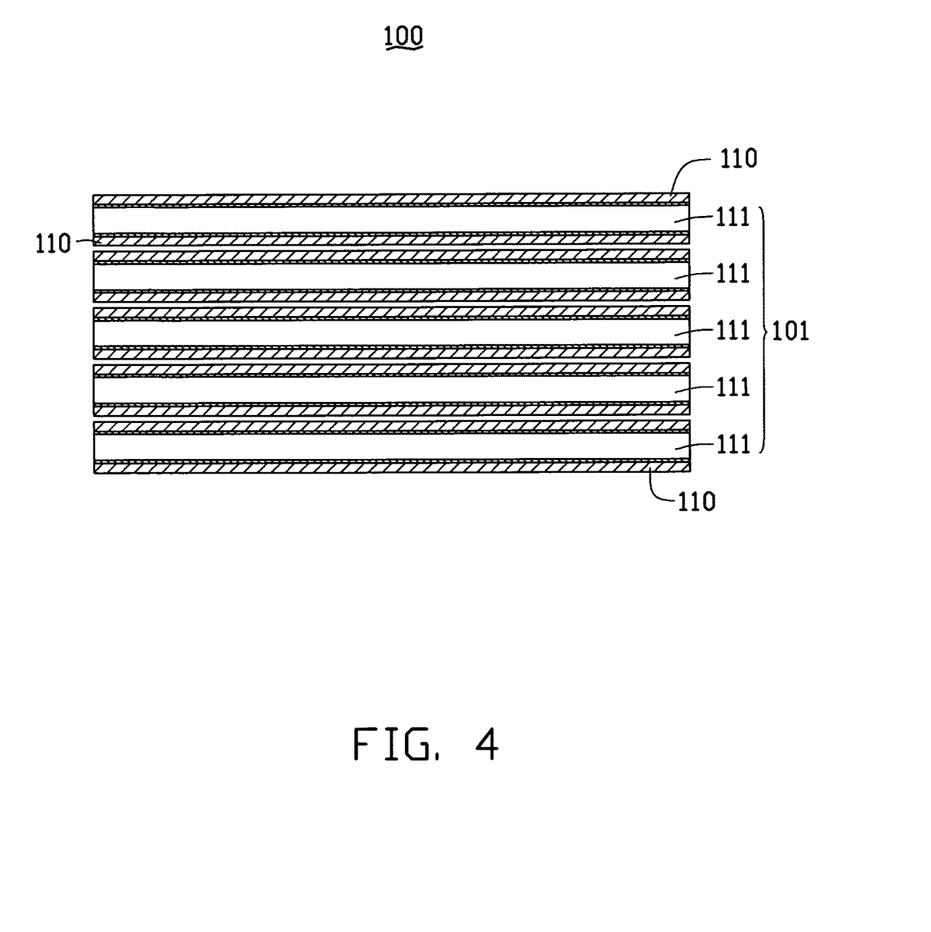
FIG. 4 is a cross-sectional view of the carbon nanotube metal composite layer of FIG. 3.

Referring to FIGS. 3 and 4, the carbon nanotube metal composite layer 100 includes a carbon nanotube layer 101 and a metal layer 110 coated on the carbon nanotube layer 101. The carbon nanotube layer 101 includes a plurality of carbon nanotubes 111. There are three embodiments for the carbon nanotube metal composite layer 100 which will be detailedly described below.

In a first embodiment, the carbon nanotube layer 101 includes one or more carbon nanotube films stacked on top of each other or contiguously located side by side. The carbon nanotube film includes a plurality of successive carbon nanotubes joined end-to-end by van der Waals attractive force therebetween. The carbon nanotubes are oriented primarily along a same orientation and are approximately parallel to each other. In this connection, the term "approximately" as used herein means that it would be impossible and unnecessary that each of the carbon nanotubes in the carbon nanotube films are parallel to one another. The carbon nanotubes are joined end-to-end to form a free-standing structure. "Free-standing" means that the carbon nanotube film does not need to be supported by a substrate and can sustain the weight of itself when it is hoisted by a portion thereof without tearing. A thickness of the carbon nanotube film can range from about 0.5 nm to about 100 μm. The carbon nanotube film can be a drawn carbon nanotube film drawn from a carbon nanotube array.

The metal layer 110 is covered on an outer surface of each individual carbon nanotube in the carbon nanotube film. The metal layer 110 includes a conductive layer. The metal layer can further include at least one of a wetting layer, a transition layer, and an anti-oxidation layer. A thickness of the metal layer can be about 1 nanometer to about 50 nanometers. A material of the metal layer 110 can be copper (Cu), silver (Ag), gold (Au), iron (Fe), cobalt (Co), nickel (Ni), palladium (Pd), titanium (Ti), platinum (Pt), and alloys thereof.

In the first embodiment, there are two examples to be described.

Example 1

Figure 5:
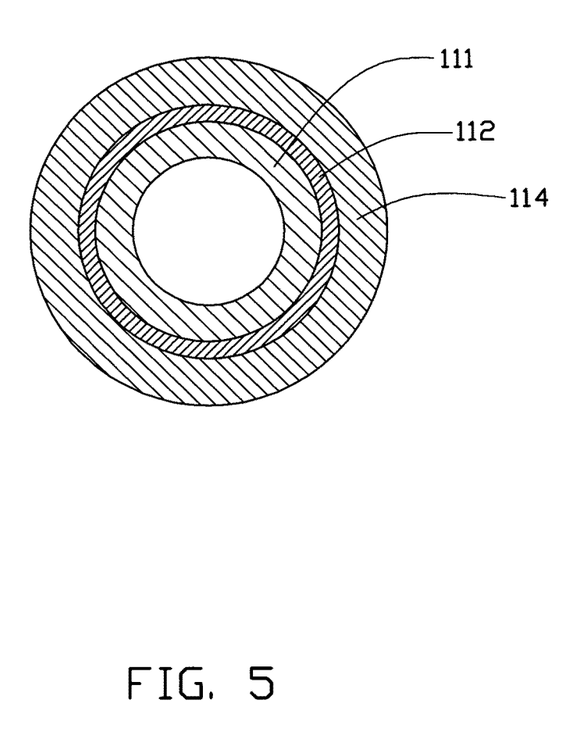
FIG. 5 is a schematic view of a single carbon nanotube in the carbon nanotube metal composite layer of FIG. 3.

Referring to FIGS. 4 and 5, the carbon nanotube metal composite layer 100 includes a carbon nanotube film 101 and the metal layer 110 covered on the carbon nanotube film 101. The carbon nanotube film 101 includes a plurality of carbon nanotubes 111. Each carbon nanotube 111 is covered by the metal layer 110 on the outer surface thereof. The metal layer 110 includes a wetting layer 112 and a conductive layer 114. The wetting layer 112 is the innermost layer, which directly covers and contacts the surface of the carbon nanotube 111. The wetting layer 112 can be a Ni layer with a thickness of about 2 nanometers. The conductive layer 114 enwraps the wetting layer 112. The conductive layer 114 can be an Ag layer with a thickness of about 10 nanometers. The resistance of the carbon nanotube metal composite layer 100 is about 1173 ohm per square, the transmittance thereof is 92.7%.

The wettability between carbon nanotubes and most metals is poor. The wetting layer 112 is configured to provide a good transition between the carbon nanotube 111 and the conductive layer 114. Besides Ni, the material of the wetting layer 112 can also be Fe, Co, Pd, Ti, and any alloys of Fe, Co, Ni, Pd, and Ti. A thickness of the wetting layer 112 can range from about 1 nanometer to about 10 nanometers.

The conductive layer 114 is arranged for enhancing the conductivity of the carbon nanotube metal composite layer 100. Besides Ag, the material of the conductive layer 114 also can be Cu, Au and any alloys of Cu, Ag, and Au. A thickness of the conductive layer 114 can range from about 1 nanometer to about 20 nanometers.

It is to be understood that the resistance and transmittance of the carbon nanotube metal composite layer are restricted by the structure and thickness of the carbon nanotube metal composite layer. For example, if each carbon nanotube in the carbon nanotube metal composite layer is enwrapped with a Ni wetting layer about 2 nanometers thick and an Au conductive layer about 15 nanometers thick, the resistance and transmittance of the carbon nanotube metal composite layer is about 495 ohm per square and 90.7% respectively. If each carbon nanotube in the carbon nanotube metal composite layer is enwrapped with a Ni wetting layer about 2 nanometers thick and an Au conductive layer about 20 nanometers thick, the resistance and transmittance of the carbon nanotube metal composite layer is 208 ohm per square and 89.7% respectively.

Example 2

A transition layer and an anti-oxidation layer cover each single carbon nanotube in the carbon nanotube film. More specifically, referring to FIG. 6, a single carbon nanotube 211 in the carbon nanotube film is covered by a metal layer 210 on the outer surface thereof. The metal layer 210 includes a wetting layer 212, a transition layer 213, a conductive layer 214, and an anti-oxidation layer 215. The wetting layer 212 is the innermost layer, and directly covers the surface of the carbon nanotube 211. The transition layer 213 enwraps the wetting layer 212. The conductive layer 214 enwraps the transition layer 213. The anti-oxidation layer 215 enwraps the conductive layer 214.

Figure 6:
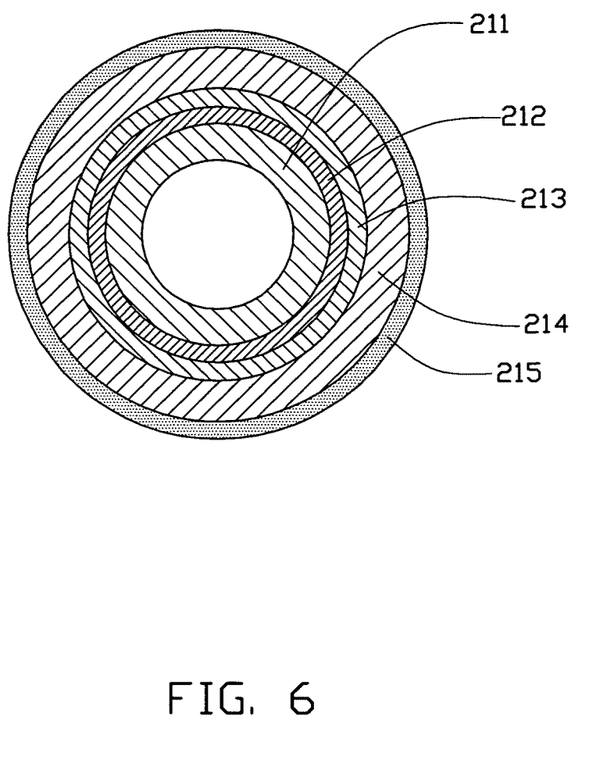
FIG. 6 is a schematic view of a single carbon nanotube in another embodiment of a carbon nanotube metal composite layer used in the touch panel of FIG. 1.

The transition layer 213 is arranged for combining the wetting layer 212 with the conductive layer 214. The material of the transition layer 213 can be combined with the material of the wetting layer 212 as well as the material of the conductive layer 214, such as Cu, Ag, or alloys thereof. A thickness of the transition layer 213 ranges from about 1 nanometer to about 10 nanometers.

The anti-oxidation layer 215 is configured to prevent the conducting layer 214 from being oxidized by exposure to the air and prevent reduction of the conductivity of the carbon nanotube metal composite layer. The material of the anti-oxidation layer 215 can be any suitable material including Au, Pt, and any other anti-oxidation metallic materials or alloys thereof A thickness of the anti-oxidation layer 215 ranges from about 1 nanometer to about 10 nanometers.

In one embodiment, the material of the wetting layer 212 is Ti, and the thickness thereof is about 2 nanometers. The material of the transition layer 213 is Cu and the thickness thereof is about 2 nanometers. The material of the conductive layer 214 is Ag and the thickness thereof is about 10 nanometers. The material of the anti-oxidation layer 215 is Pt and the thickness thereof is about 2 nanometers.

In a second embodiment, the carbon nanotube layer includes one or more carbon nanotube wires crossed or braided into a net. Each carbon nanotube wire in the carbon nanotube layer includes a plurality of carbon nanotubes joined end-to-end by van der Waals attractive force, and are substantially parallel to or helically twisted along a longitudinal axis of the carbon nanotube wire. The metal layer is metal nanoparticles. If the carbon nanotube layer includes one carbon nanotube wire, the metal nanoparticles are randomly dispersed in the carbon nanotube wire. If the carbon nanotube layer includes a plurality of carbon nanotube wires, the plurality of carbon nanotube wires may be arranged side by side or may be intercrossed, and the metal nanoparticles are dispersed in at least one of the carbon nanotube wires.

In a third embodiment, the metal layer includes one or more metal nanowires crossed or braided into a net. The carbon nanotube layer may be carbon nanotube powder or carbon nanotube wires. If the metal layer includes one metal nanowire, the carbon nanotube layer is randomly dispersed in the metal nanowire. If the metal layer includes more metal nanowires, the more metal nanowires may be arranged side by side or may be intercrossed, the carbon nanotube layer is dispersed in at least one of the metal nanowires.

In one embodiment, both the first and second transparent conductive layers 122, 142 are the carbon nanotube metal composite layer 100. It is noted that the carbon nanotube film has a specific surface area and the carbon nanotube metal composite layer 100 is adherent in nature. As such, the carbon nanotube metal composite layer 100 can be adhered directly to the bottom surface 1202 of the substrate 120 and the top surface 1404 of the second substrate 140.

The carbon nanotube metal composite layer 100, once adhered to the first substrate 120 or the second substrate 140, can be treated with an organic solvent. The carbon nanotube metal composite layer 100 can be treated by using organic solvent to soak the entire surface of the carbon nanotube metal composite layer 100. The organic solvent is volatile, and can be, for example, ethanol, methanol, acetone, dichloroethane, chloroform, and combinations thereof. In one embodiment, the organic solvent is ethanol. After being soaked by the organic solvent, the carbon nanotube metal composite layer 100 can more firmly adhere to the first and second substrates 120, 140, and the mechanical strength and toughness of the carbon nanotube metal composite layer 100 are increased and the coefficient of friction of the carbon nanotube metal composite layer 100 is reduced.

In one embodiment, the carbon nanotube metal composite layer 100 can also be adhered to the first and second substrates 120, 140 by an adhesive.

The first electrodes 124 and the second electrodes 144 are made of metal, conductive resin, carbon nanotube film, or any other conductive material, so long as it is electrically conductive. In one embodiment, both the first and second electrodes 124, 144 are silver paste. It is noted that, the electrodes of a flexible touch panel should be tough but flexible.

The transparent dot spacers 16 are separately located on the second conductive layer 142. The insulative frame 18 is mounted between the bottom surface 1202 of the first substrate 120 and the top surface 1404 of the second substrate 140. The transparent dot spacers 16 and the insulative frame 18 are made of, for example, insulative resin or any other suitable insulative material. Insulation between the first electrode plate 12 and the second electrode plate 14 is provided by the transparent dot spacers 16 and the insulative frame 18. It is to be understood that the transparent dot spacers 16 are optional, particularly when the touch panel 10 is relatively small. They serve as supports given the size of the span and the strength of the first electrode plate 12.

The shielding layer 15 is located on the bottom surface 1402 of the second substrate 140. The material of the shielding layer 15 can be ITO, antimony tin oxide (ATO), carbon nanotube film, or other conductive materials. In one embodiment, the shielding layer 15 is a carbon nanotube film. The carbon nanotube film includes a plurality of carbon nanotubes. The shielding layer 15 is connected to the ground and plays a role of shielding and, thus, enables the touch panel 10 to operate without interference (e.g., electromagnetic interference).

The passivation layer 17 is attached to the shielding layer 15. The material of the passivation layer 17 can, for example, be silicon nitride or silicon dioxide. The passivation layer 17 can protect the shielding layer 15 from chemical or mechanical damage.

The protective layer 19 is located on the top surface 1204 of the first substrate 120. The material of the protective layer 19 is transparent, and can be silicon nitrides, silicon dioxides, benzocyclobutenes, polyester films, or polyethylene terephthalates. The protective layer 19 can be made of slick plastic and receive a surface hardening treatment to protect the first electrode plate 12 from being scratched when in use.

It can be understood that the shielding layer 15, the passivation layer 17 and protective layer 19 are optional structures.

It is noted that, in one embodiment, the two first electrodes 124 and the two second electrodes 144 are both attached to and electrically connect with the second transparent conductive layer 142. The two first electrodes 124 are separately located at two ends of the second transparent conductive layer 142 along a first direction. The two second electrodes 144 are separately located on the top surface 1404 of the second substrate 140 along a second direction. The first and second directions intersect with each other.

Figure 7:
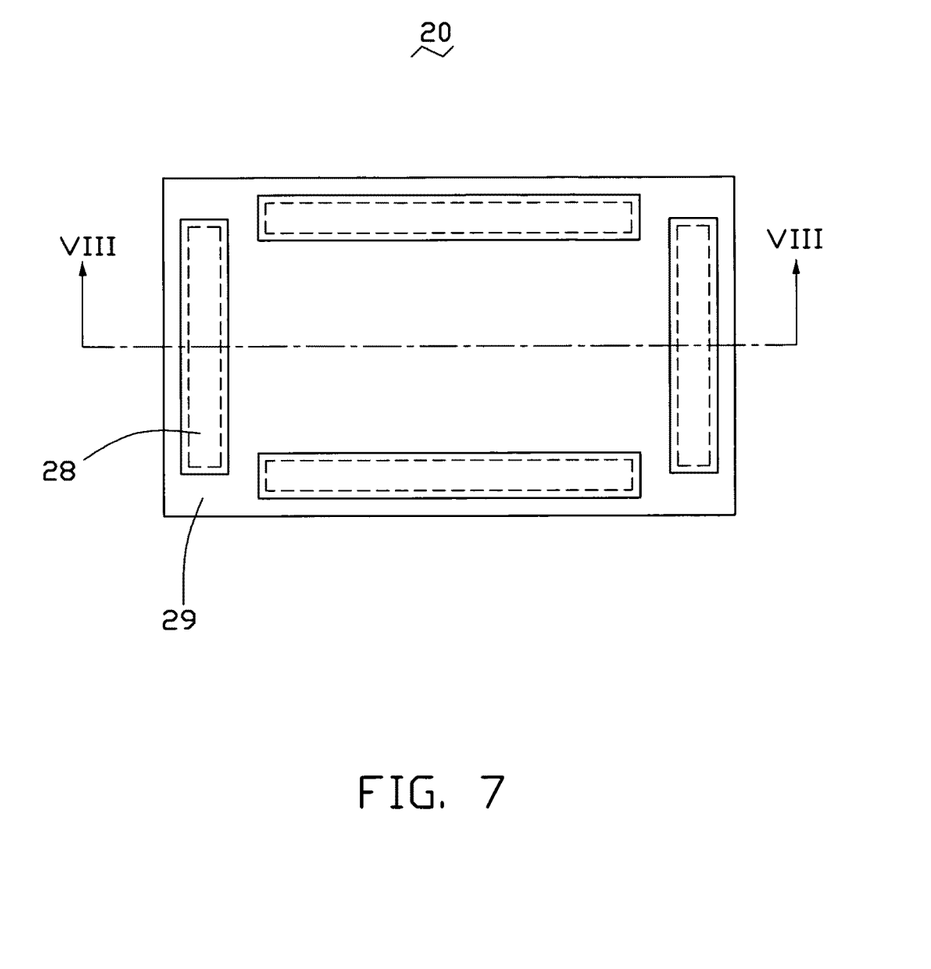
FIG. 7 is a top view of another embodiment of a touch panel.

Referring to FIG. 6 and FIG. 7, a capacitance-type touch panel 20 of one embodiment is provided. The touch panel 20 includes a substrate 22, a transparent conductive layer 24, a shielding layer 25, a passivation layer 27, at least two electrodes 28, and a protective film 29. The substrate 22 includes a top surface 221 and a bottom surface 222 opposite to the top surface 221. The transparent conductive layer 24 is attached to the top surface 221 of the substrate 22. The shielding layer 25 is located on the bottom surface 222 of the substrate 22. The passivation layer 27 is attached to a bottom of the shielding layer 25. The shielding layer 25 is located between the passivation layer 27 and the substrate 22. The electrodes 28 are located at the periphery of the transparent conductive layer 24, spaced from each other, and electrically connected to the transparent conductive layer 24 to form equipotential lines thereon. The protective layer 29 can be directly coated on the transparent conductive layer 24 and the electrodes 28.

The substrate 22 can have a curved structure or a planar structure and functions as a supporter. The substrate 22 may be made of a rigid material or a flexible material, such as glass, silicon, diamond, plastic, or the like. In one embodiment, the substrate 22 is glass.

The transparent conductive layer 24 includes a carbon nanotube metal composite layer. The carbon nanotube metal composite layer includes a carbon nanotube layer and a metal layer covered on the carbon nanotube layer. In one embodiment, the transparent conductive layer 24 has the same configuration as the first transparent conductive layer 122 or the second transparent conductive layer 142.

For compatibility with the rectangular-shaped touch area, the transparent conductive layer 24 and the substrate 22 also have a rectangular shape. In one embodiment, to form a uniform resistive net on the transparent conductive layer 24, the touch panel 20 has four electrodes 28 respectively located at the four sides of the transparent conductive layer 24. Understandably, the four electrodes 28 can be located on different surfaces of the transparent conductive layer 24 as long as equipotential lines can be formed on the transparent conductive layer 24. A material of the electrodes 28 may be the same as that of the first and second electrodes 124, 144 of the touch panel 10. In one embodiment, the material of the electrodes 28 is Ag.

The material and function of the shielding layer 25, the passivation layer 27 and the protective layer 29 is the same as that of the shielding layer 15, the passivation layer 17, and the protective layer 19 in the touch panel 10, respectively.

Figure 8:
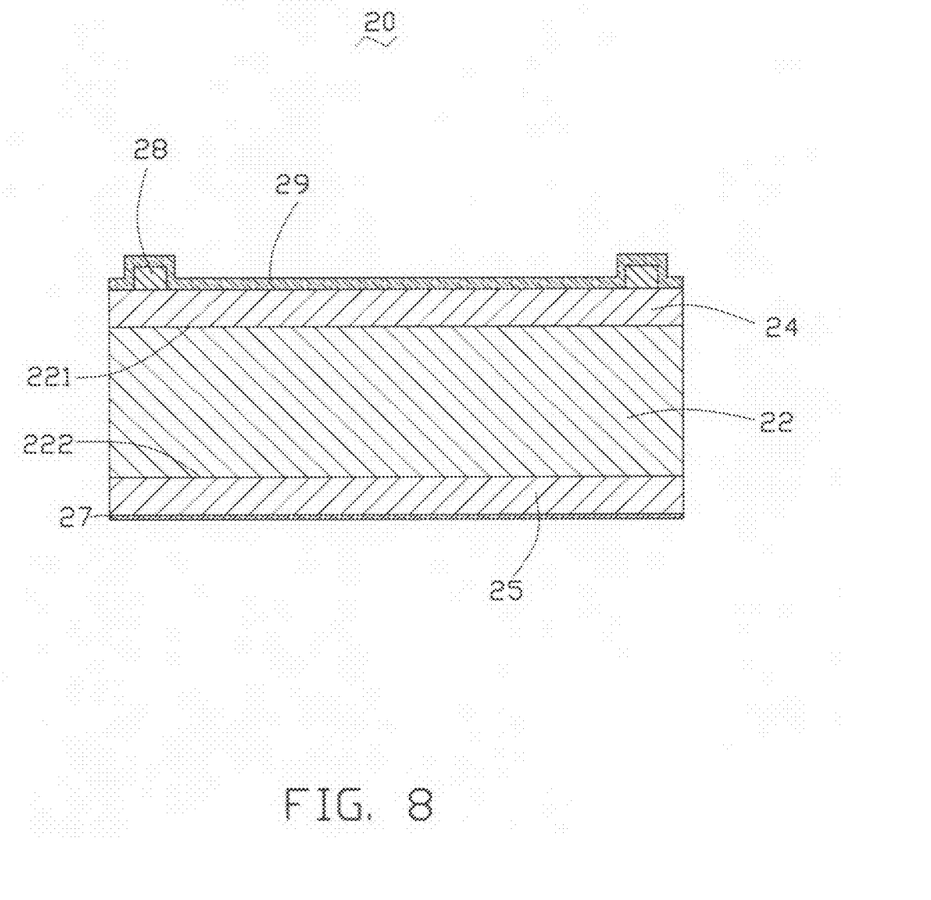
FIG. 8 is a cross-sectional view along a broken line VIII-VIII of the touch panel of FIG. 6.

Referring to FIG. 8, a display device 400 of one embodiment is provided. The display device 400 includes the touch panel 10, a display element 430, a touch controller 440, a central processing unit (CPU) 450, and a display controller 460. The touch panel 10 is opposite and adjacent to the display element 430, and is electrically connected to the touch controller 440. The touch controller 440, the CPU 450, and the display controller 460 are electrically connected. The CPU 450 is connected to the display controller 460 to control the display element 430.

The display element 430 is opposite and adjacent to the passivation layer 17 of the touch panel 10. The touch panel 10 can be spaced from the display element 430 or installed directly on the display element 430. The display element 430 can be, e.g., a liquid crystal display, a field emission display, a plasma display, an electroluminescent display, a vacuum fluorescent display, a cathode ray tube, or another display device. In one embodiment, the passivation layer 17 is spaced from the display element 430 with a gap 426. The display element 430 is a liquid crystal display.

In operation, a voltage is applied to each of the two first-electrodes 124 of the first electrode plate 12 and to each of the two second-electrodes 144 of the second electrode plate 14. A user operates the display device 400 by pressing the first electrode plate 12 of the touch panel 10 with a finger, a pen/stylus 470, or the like while visually observing the display element 430 through the touch panel 10. This pressing causes a deformation 480 of the first electrode plate 12. The deformation 480 of the first electrode plate 12 causes a connection between the first transparent conductive layer 122 and the second transparent conductive layer 142 of the second electrode plate 14. Changes in voltages in the X direction of the first transparent conductive layer 142 and the Y direction of the second transparent conductive layer 142 can be detected by the touch controller 440. Then the touch controller 440 transforms the changes in voltages into coordinates of the pressing point, and sends the coordinates of the pressing point to the CPU 450. The CPU 450 then sends out commands according to the coordinates of the pressing point and further controls the display of the display element 430.

Figure 9:
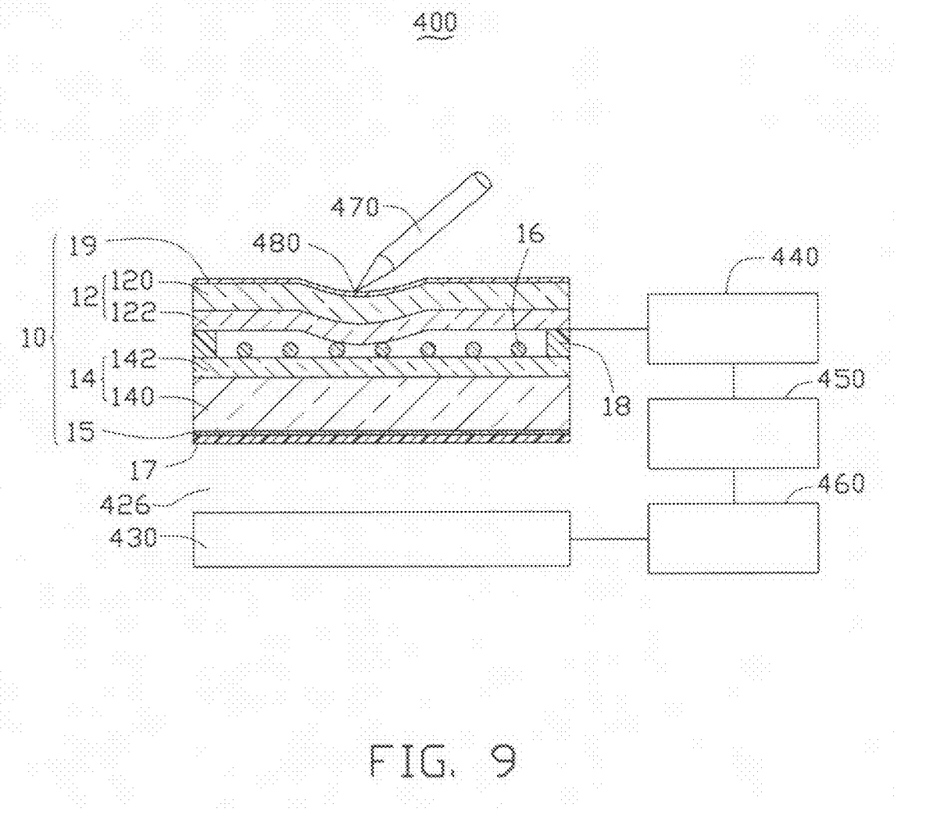
FIG. 9 is essentially a schematic cross-sectional view of a display device employing the touch panel of FIG. 2, showing an operation of the touch panel with a pen.
Figure 10:
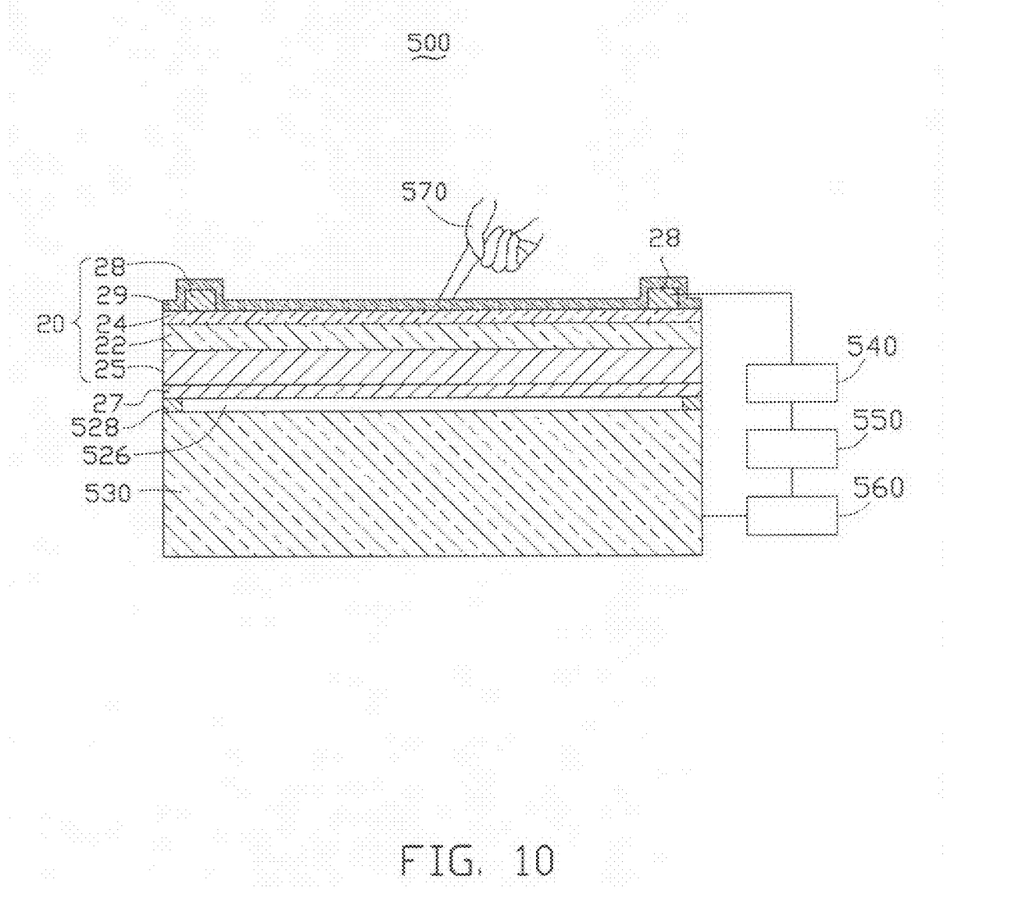
FIG. 10 is essentially a schematic cross-sectional view of a display device employing the touch panel of FIG. 8, showing an operation of the touch panel with a finger.

Referring to FIG. 9, a display device 500 of one embodiment is provided. The display device 500 includes the touch panel 20, a display element 530, a touch controller 540, a CPU 550, and a display controller 560. The touch panel 20 is opposite and adjacent to the display element 530, and is electrically connected to the touch controller 540. The touch controller 540, the CPU 550, and the display controller 560 are electrically connected. The CPU 550 is connected to the display controller 560 to control the display element 530.

The display element 530 is opposite and adjacent to the passivation layer 27 of the touch panel 20. The touch panel 20 can be spaced from the display element 530 or installed directly on the display element 530. The type of the display element 530 may be the same with the display element 430. In one embodiment, the passivation layer 27 is spaced from the display element 530 by two or more spacers 528. Thus, a gap 526 is provided between the passivation layer 27 and the display element 530. The display element 530 is a liquid crystal display.

In operation, a voltage is applied to the electrodes 28 respectively. A user operates the display device 500 by pressing or touching the protective layer 29 of the touch panel 20 with a pen/stylus, a finger 570, or the like, while visually observing the display element 530 through the touch panel 20. Due to an electrical field of the user, a coupling capacitance forms between the user and the transparent conductive layer 24. For high frequency electrical current, the coupling capacitance is a conductor, and thus the finger 570 takes away a little current from the touch point. Currents flowing through the four electrodes 28 cooperatively replace the current lost at the touch point. The quantity of current supplied by each electrode 28 is directly proportional to the distance from the touch point to the each electrode 28. The touch controller 540 is used to calculate the proportion of the four supplied currents, thereby detecting coordinates of the touch point on the touch panel 20. The touch controller 540 then sends the coordinates of the touch point to the CPU 550. The CPU 550 receives the coordinates, and processes the coordinates into a command. Finally, the CPU 550 sends out the command to the display controller 560. The display controller 560 controls the display of the display element 530 accordingly.

As described above, the carbon nanotube metal composite layer has superior properties, such as excellent toughness, and high mechanical strength. Thus, the touch panels and the display devices using the same are durable. Each carbon nanotube metal composite layer includes a carbon nanotube layer and a metal layer, and the carbon nanotube layer is covered by the metal layer. The carbon nanotube layer and the metal layer have superior conductivity. As such, the carbon nanotube metal composite layer also has superior conductivity, low resistivity, uniform resistance distribution, and is suitable for the transparent conductive layer in touch panels. Thus, the touch panels and the display devices employing the same have improved sensitivity and accuracy. Furthermore, the carbon nanotube metal composite layer has high transparency, thereby promoting improved brightness of the touch panels and the display devices using the same. Additionally, the carbon nanotube metal composite layer is flexible, and can be used in a flexible touch panel and a flexible display device adopting the same.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

What is claimed is:

1. A touch panel, comprising:
a first electrode plate comprising a first substrate, a first transparent conductive layer attached on the first substrate, and two first electrodes separately located at two ends of the first transparent conductive layer and extended substantially along a first direction; and
a second electrode plate spaced from the first electrode plate and comprising a second substrate, a second transparent conductive layer attached on the second substrate, and two second electrodes separately located at two ends of the second transparent conductive layer and extended substantially along a second direction, the first direction being substantially perpendicular to the second direction, and the second transparent conductive layer being opposite to the first transparent conductive layer;
wherein at least one of the first transparent conductive layer and the second transparent conductive layer comprises a carbon nanotube metal composite layer comprising a carbon nanotube layer and a metal layer, the carbon nanotube layer comprises a plurality of carbon nanotubes, the metal layer is wrapped around each of the plurality of carbon nanotubes.

2. The touch panel as claimed in claim 1, wherein a thickness of the carbon nanotube metal composite layer is in a range from about 1.5 nanometers to about 1 millimeter.

3. The touch panel as claimed in claim 1, wherein the carbon nanotube layer comprises at least one carbon nanotube film, the carbon nanotube film comprises a plurality of carbon nanotubes joined end-to-end by van der waals attractive force.

4. The touch panel as claimed in claim 3, wherein both the first transparent conductive layer and the second transparent conductive layer comprises the conductive metal composite layer; the plurality of carbon nanotubes of the first transparent conductive layer extend substantially along the second direction; and the plurality of carbon nanotubes of the second transparent conductive layer extend substantially along the first direction.

5. The touch panel as claimed in claim 1, wherein the carbon nanotube layer comprises at least one carbon nanotube wire crossed or braided into a net, the at least one carbon nanotube wire comprises a plurality of carbon nanotubes joined end-to-end by van der waals attractive force, and are substantially parallel to or helically twisted along a longitudinal axis of the carbon nanotube wire.

6. The touch panel as claimed in claim 1, wherein the metal layer includes a conductive layer.

7. The touch panel as claimed in claim 6, wherein the metal layer further includes at least one layer of a wetting layer, a transition layer, and an anti-oxidation layer; the wetting layer is the innermost layer, the transition layer enwraps the wetting layer, and the anti-oxidation layer is the outermost layer.

8. The touch panel as claimed in claim 7, wherein a thickness of the wetting layer ranges from about 1 nanometer to about 10 nanometers.

9. The touch panel as claimed in claim 7, wherein a thickness of the transition layer ranges from about 1 nanometer to about 10 nanometers.

10. The touch panel as claimed in claim 7, wherein a thickness of the anti-oxidation layer ranges from about 1 nanometer to about 10 nanometers.

11. The touch panel as claimed in claim 7, wherein a material of the wetting layer is Ti having a thickness of about 2 nanometers, a material of the transition layer is Cu having a thickness of about 2 nanometers, a material of the conductive layer is Ag having a thickness of about 10 nanometers, a material of the anti-oxidation layer is Pt having a thickness of about 2 nanometers.

12. The touch panel as claimed in claim 1, wherein a thickness of the metal layer is in a range from about 1 nanometer to about 50 nanometers.

13. A touch panel, comprising:
a substrate comprising a surface;
a transparent conductive layer attached on the surface of the substrate; and
four electrodes separately located at four sides of the transparent conductive layer and electrically connected to the transparent conductive layer;
wherein, the transparent conductive layer comprises a carbon nanotube metal composite layer comprising a carbon nanotube layer comprising a plurality of carbon nanotubes and a metal layer wrapped around each of the plurality of carbon nanotubes.

14. The touch panel as claimed in claim 13, wherein the carbon nanotube layer comprises at least one carbon nanotube film, the at least one carbon nanotube film comprises a plurality of carbon nanotubes joined end-to-end due to van der waals attractive force.

15. The touch panel as claimed in claim 13, wherein the carbon nanotube layer comprises at least one carbon nanotube wire crossed or braided into a net, the at least one carbon nanotube wire comprising a plurality of carbon nanotubes joined end-to-end by van der waals attractive force, and are substantially parallel to or helically twisted along a longitudinal axis of the carbon nanotube wire.

16. A display device, comprising:
a touch panel comprising at least one transparent conductive layer and at least two electrodes separately separately located at two opposite ends of the least one transparent conductive layer; and
a display element adjacent to the touch panel;
wherein, the at least one transparent conductive layer comprises at least one carbon nanotube film comprising a plurality of carbon nanotubes joined end-to-end by van der waals attractive force and extended substantially along a first direction, the at least two electrodes are extended substantially along a second direction, the first direction is substantially perpendicular to the second direction, and a metal layer wrapped around each of the plurality of carbon nanotubes.

17. The display device as claimed in claim 16, wherein the at least one drawn carbon nanotube film comprises a plurality of carbon nanotube films stacked on top of each other or located side by side.

18. The touch panel as claimed in claim 16, wherein the metal layer comprises a wetting layer and a conductive layer located on the wetting layer, the wetting layer is located between the conductive layer and each of the carbon nanotubes.

* * * * *